Dec. 26, 1961 — R. W. SONNENFELDT — 3,015,069
OSCILLATING IN-PHASE DETECTORS
Filed Nov. 7, 1956 — 5 Sheets-Sheet 1

INVENTOR.
RICHARD W SONNENFELDT
BY
ATTORNEY

Dec. 26, 1961   R. W. SONNENFELDT   3,015,069
OSCILLATING IN-PHASE DETECTORS
Filed Nov. 7, 1956   5 Sheets-Sheet 2

INVENTOR.
RICHARD W. SONNENFELDT
BY
ATTORNEY

INVENTOR.
RICHARD W SONNENFELDT
BY
ATTORNEY

Dec. 26, 1961 R. W. SONNENFELDT 3,015,069
OSCILLATING IN-PHASE DETECTORS
Filed Nov. 7, 1956 5 Sheets-Sheet 4

Fig. 9A. — OSCILLATING IN-PHASE DETECTOR

INVENTOR.
RICHARD W. SONNENFELDT
BY
ATTORNEY

United States Patent Office 3,015,069
Patented Dec. 26, 1961

3,015,069
OSCILLATING IN-PHASE DETECTORS
Richard W. Sonnenfeldt, Haddonfield, N.J., assignor to Radio Corporation of America, a corporation of Delaware
Filed Nov. 7, 1956, Ser. No. 620,959
23 Claims. (Cl. 329—150)

The present invention relates to improved signal detector circuits for deriving signal intelligence from an amplitude modulated carrier and, more particularly, but not exclusively, to improved signal detectors for deriving the intelligence from vestigial sideband modulated carriers of the type used for the transmission of video information.

When a carrier is flanked by an upper and lower side frequency, both related to a modulating tone in an amplitude modulated wave system, the upper and lower side frequencies will provide for amplitude modulation of the carrier without any attendant change in the phase of the carrier since the resultant of the upper and lower side frequencies are in phase with the carrier. Should one of the side frequencies be eliminated or reduced in amplitude, then the vector resultant of the two side frequencies, when vectorally combined with the carrier, will produce a total vector resultant which is not only changed in amplitude but also in phase, relative to the phase of the carrier before the asymmetry was produced. The component of the total vector resultant which is in phase with the original carrier is a so-called "in-phase" component and represents the desired signal information, that is, the modulating signal information which is represented by the sidebands of a corresponding double sideband modulated carrier. The component of the total resultant which is in quadrature with the carrier is the "quadrature" component and represents a distortion component. For a general discussion of "in-phase" and "quadrature" components in the transmission of asymmetrical sideband signals, see the paper by Murakami and Sonnenfeldt entitled, "Transient Response of Detectors in Symmetric and Asymmetric Sideband Systems," published in the RCA Review, December, 1955.

The present invention is a novel oscillating detector which is responsive to only the "in-phase" component of a received signal; such a detector, hereinafter termed an "oscillating in-phase detector," is relatively insensitive to the quadrature component and will therefore provide for product detection of a modulating signal, with greatly reduced distortion and greatly improved readability, from an asymmetric sideband signal such as the vestigial sideband television signal used in present day commercial television broadcasting.

It is an object of the invention to provide an improved signal detector.

It is a further object of the invention to provide an improved oscillating detector for use in deriving the "in-phase" component from a vestigial sideband modulated carrier.

According to the invention, a modulated wave having a carrier frequency asymmetrically flanked by side frequencies, and having an in-phase component representing signal intelligence, is introduced into an electron stream of an oscillator oscillating at high level. The carrier is caused to phase-lock the oscillations produced by the oscillator to the phase of the carrier in the electron stream, using a locking bandwidth only wide enough to include the carrier component of the modulated wave. Product detection of the oscillations and the amplitude modulated carrier takes place in the electron stream of the oscillator with the average value of current in the electron stream thereupon following the in-phase component of intelligence included in the amplitude modulated carrier. The oscillator is optimally caused to phase lock its oscillations to the phase of the carrier of the amplitude modulated wave by designing the oscillator whereby a relationship exists between the current in the electron stream of the amplifying device of the oscillator and the voltage applied a control electrode of that oscillator which is a "double limiting" or "double clipping" relationship; that is, the amplifying device, or an associated device, is caused to produce a limiting or clipping of the electron flow of the amplifier device for regions of both large negative and positive values of applied voltage; in these regions, changes in control voltage do not cause appreciable corresponding changes in electron flow or current.

Other and incidental objects of this invention will become apparent upon a reading of the specification and a study of the figures, where.

Oscillating in-phase detectors of the present invention are characterized by having oscillations developed in an oscillator, employing an amplifier device in which a controllable electron flow is used for the production of oscillations. The oscillations developed in the electron flow are therein phase-synchronized to the phase of the carrier of an amplitude modulated carrier of the asymmetrical sideband type which has introduced into the electron flow. By additionaly using an amplifier device which has a non-linear relationship between the electron flow and the applied voltages which control the electron flow, product detection of the modulation portion of the modulated carrier will thereupon take place.

Many circuits exist in the prior art which provide the function of injection locking the oscillations of an oscillator; however, the condition of an oscillator being locked in-phase has been very loosely referred to, and in general has referred to the phase relationship between oscillations developed in one or more circuits external to the amplifier device of an oscillator and to the phase of an applied locking signal, and at a point not in the electron flow.

If the phase of the oscillations and the phase of the carrier component of a modulated carrier in the electron flow of an amplifier device are not substantially in the same phase, although phase locking of the oscillations has been achieved, then an oscillating detector cannot function as an in-phase detector.

In order for an oscillator to function whereby developed oscillations in the electron flow of an amplifier device of the oscillator are caused to be in the same phase as an applied locking signal, such as the carrier of a vestigial-sideband amplitude modulated carrier, in the electron flow, the oscillator must include structure or conform to the following design characteristics:

In order for an oscillator to be capable of phase locking in the electron stream of its amplifier device to the phase of carrier signal, it is important that the amplifier device have a voltage-current characteristic curve which is of a "double-limiting" or "double-clipping" form; for example, in a triode, the plate current ($i_p$) vs. grid voltage ($e_g$) characteristic curve will have at least two regions or current where a change in grid voltage will not cause a substantial corresponding change in plate current. One of the aforementioned two regions may correspond to the region where the plate current has been virtually cut off and the other may correspond to a region of complete plate current saturation.

Figure 1A:
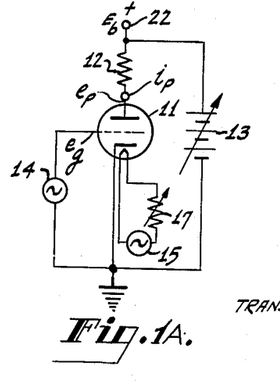
FIGURE 1A is a schematic diagram of an amplifier circuit capable of providing "double limiting" of amplifier current.
Figure 1B:
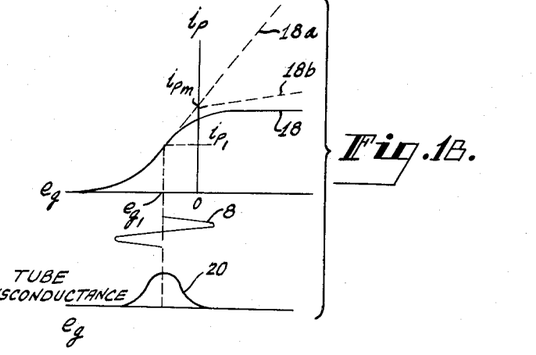
FIGURE 1B depicts characteristic curves relating to plate-voltage and grid-current and to tube transconductance.

The voltage current characteristic curve 18 shown in FIGURE 1B is a typical "double-limiting" characteristic curve. The plate current $i_p$ is cut off for large negative values of grid voltage $e_g$; for values of grid voltage in excess of $e_g=0$, the plate current remains substantially at the constant value $i_{pm}$. Such a characteristic curve may be achieved in a tube such as the triode 11 of FIGURE 1A. The anode of the triode 11 is coupled to a resistor 12 which is in turn coupled to a variable potential source 13; the cathode of tube 11 is coupled to ground, and a grid voltage source 14 providing a grid voltage $e_g$ is coupled between the grid and cathode. Controllable power for the filament for the triode 11 is provided from the generator 15 by way of the variable resistor 17.

There are at least two methods for causing the triode 11 in FIGURE 1A to function with a "double-limiting" characteristic curve 18. These two methods are:

(A) The characteristic curve 18 may be obtained by reducing the potential supplied by the potential source 13 to the anode of the triode 11 to a very low value.

(B) The characteristic curve 18 of FIGURE 1B may be achieved in the circuit of FIGURE 1A by reducing the filament power provided from the generator 15 to the filament.

Other means of obtaining characteristic curves in amplifying devices such as electron tubes or transistors, which correspond to the characteristic curve 18 of FIGURE 1B, will be described in other circuits to be discussed in the specification.

When an electron flow device such as a triode 11 is operated to have a "double-limiting" characteristic curve such as the characteristic curve 18 of FIGURE 1B, the tube transconductance will have a form similar to the curve 20 of FIGURE 1B; according to the curve 20, the tube transconductance is substantially zero in both of the regions in which plate current limiting occurs and has a peak or maximum value at approximately the grid voltage $e_{g1}$ which corresponds to a plate current $e_{p1}$ whose value is approximately one half of the maximum current $i_{pm}$. The triode 11 will, therefore, have maximum gain at the grid voltage $e_{g1}$. If an alternating-current voltage, such as the alternating-current voltage 8 derived from the source 14, is applied with a bias voltage $e_{g1}$ between the grid and cathode of the triode 11, and caused to develop oscillations therein, the triode circuit will be operated in a condition of minimum dissipation since the alternating current voltage 8 passes through zero at the point of maximum transconductance or gain. If a second alternating current voltage were to be introduced between the grid and cathode of triode 11, a condition of minimum dissipation would again be achieved if the second voltage passes through zero at the point of maximum gain.

If the triode is connected in an oscillator circuit and if the second alternating current voltage is a locking signal such as the carrier of an amplitude modulated wave of correct frequency, locking or synchronization of the oscillations to the carrier will take place when the carrier and the locally generated oscillations are in the same phase in the electron stream of the triode, so that the oscillator will oscillate with minimum loss. Hence it follows that an oscillator circuit having a "double-limiting" or "double-clipping" characteristic curve relating its collector current or anode current to its grid voltage will be an oscillator capable of providing product detection which is "in-phase" in its electron stream; such an oscillator is ideally suited for use in an oscillating in-phase detector of the present invention.

The product detection mentioned above is possible since the anode current—grid voltage characteristic curves, which will produce in-phase locking or synchronization in the electron stream, are also non-linear; therefore, the waves representing an amplitude modulated carrier having in-phase and quadrature components, and the carrier synchronized oscillations, will beat together in the electron stream to form a modulation product which represents the "in-phase" component of the signal intelligence conveyed by the amplitude modulated carrier. Since the interaction of the amplitude modulated carrier and the carrier synchronized oscillations take place in the electron flow of an amplifier device of the present invention, it is clear, therefore, that the phase locking or synchronization of the oscillator oscillations must necessarily be in terms of the "in-phase" phase locking of the oscillations which are produced in the electron stream, and not those oscillations which are produced elsewhere in the oscillator circuits where they may be phase locked, though not at carrier phase.

Whereas an oscillator in-phase detector of the present invention, optimally detects the in-phase component of an amplitude modulated carrier having both in-phase and quadrature components, it is to be appreciated that the oscillating in-phase detector of the present invention will optimally detect the signal intelligence in an amplitude modulated carrier having only an in-phase component.

Figure 2A:
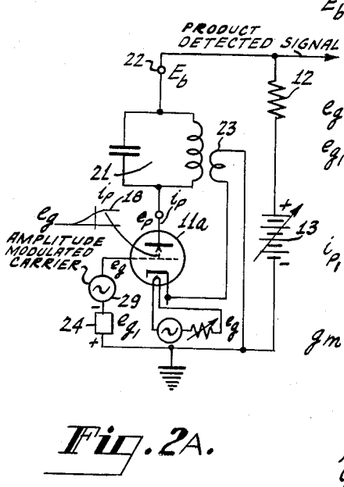
FIGURE 2A is a schematic diagram of an oscillating in-phase detector of the present invention.

FIGURE 2A is a schematic diagram of one form of oscillating in-phase detector of the present invention; the ability of the oscillations developed by the oscillator to be phase locked to the carrier of an amplitude modulated carrier in the electron stream of a tube 11a, will be shown to be related to the shape of the grid voltage vs. plate current characteristic curve of that tube.

Figure 2B:
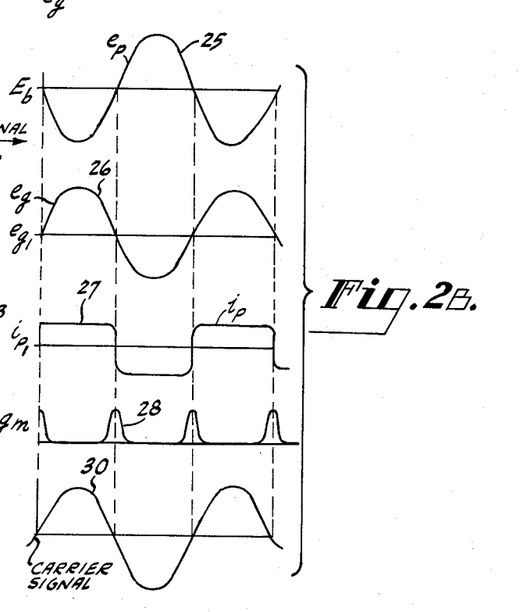
FIGURE 2B depicts waveforms relating to the oscillations of the circuit of FIGURE 2A.

In the circuit of FIGURE 2, a tuned resonant circuit 21 and an output resistor 12 are serially coupled between the anode of tube 11a and a potential terminal 22 at which a positive potential is provided. A circuit coupled to the cathode of tube 11a includes a coupling loop 23 which is coupled to the tuned resonant circuit 21, a bias potential source 24 which provides a bias voltage $e_{g1}$ and a source 29 of a modulated carrier whose frequency is substantially that of the tuned resonant circuit 21. The oscillator circuit of FIGURE 2A will oscillate to provide the waveforms shown in FIGURE 2B. The voltage $e_p$ illustrated by the curve 25 of FIGURE 2B is developed at the anode of tube 11a.

The alternating-current grid voltage $e_g$, provided by the coupling loop 23 and swinging about the voltage $e_{g1}$, is developed at the control grid of tube 11a. This voltage is described by the curve 26 of FIGURE 2B and is that voltage which is developed at the control grid of tube 11a before the application of the modulated carrier. The plate current and the transconductance of tube 11a correspond to the curves 27 and 28 of FIGURE 2B.

Let an amplitude modulated carrier having a wide bandwidth be introduced by the source 29 into the circuit between the cathode and the control grid of tube 11a and let the bandwidth of the resonant circuit be such that the oscillator will lock only to the carrier of the amplitude modulated carrier; that is, the locking range of the oscillator is used and is much narrower than the total bandwidth of the amplitude modulated carrier and includes substantially only the carrier frequency.

In order for the principles of conservation of energy to be maintained, the oscillator circuit of FIGURE 2A will reach an equilibrium operating condition conforming to a condition of minimum dissipation. This condition of minimum dissipation will be achieved when the phase of the carrier signal represented by the curve 30 of FIGURE 2B will pass through zero when the electron tube 11a is being operated in the region of transconductance. Comparing the carrier voltage 30 and the grid voltage 26 in FIGURE 2B, it is seen that these two voltages are exactly in phase, that is, having zero phase difference in the electron stream.

A plate current vs. grid voltage characteristic curve of the type illustrated by the characteristic curve 18 has been shown to be an ideal characteristic curve for providing a condition whereby the oscillations of an oscillator will be synchronized to the phase of an applied locking signal voltage. Should the plate current vs. grid voltage characteristic curve differ in form from the form of the characteristic curve 18, say to provide a characteristic curve corresponding to the characteristic curve illustrated by the dash-line curve 18a in FIGURE 1B, it can be shown for many types of connections, the oscillations in the electron stream of an oscillator will lock in phase to a phase 90° displaced from the phase of the carrier of the modulated carrier and the product detection will produce the quadrature component rather than the in-phase component of the signal intelligence included in the modulated carrier if the modulated carrier has vestigial sidebands.

Improved product detection characteristics within an amplifier device such as an electron tube or transistor, may be provided by a characteristic curve resembling the characteristic curve 18a though such characteristics will lead phase locking wherein a phase difference of a few degrees exists between the oscillations and the carrier in the electron stream of the device, rather than a zero-degree phase difference. For an alternative mode of operation of an oscillating in-phase detector which provides both self-oscillations which are phase locked to the carrier of an incoming amplitude modulated wave, and which provides product detection of the intelligence included in the applied amplitude modulated wave, a characteristic curve having the general characteristics of the characteristic curve 18b shown in FIGURE 1B may therefore be adopted.

Figure 3:
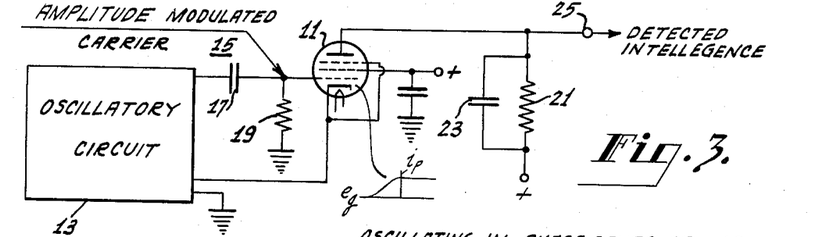
FIGURE 3 is a schematic diagram of an oscillating in-phase detector of the present invention.

FIGURE 3 is a diagram of one form of oscillating in-phase detector of the present invention. A tube 11 is utilized as a combined oscillator and mixer device. An oscillatory circuit 13 is coupled between the control grid and cathode of tube 11; the oscillatory circuit 13 employs a grid leak circuit 15 which includes a condenser 17 and a resistor 19. By operatively connecting the oscillatory circuit so that a voltage is developed at the control grid at a phase 180° out of phase with respect to the voltage developed at the cathode of tube 11, high level oscillations will be developed into the electron stream of tube 11. A resistive load 21 is coupled to the anode of tube 11; the resistive load is shunted by condenser 23. By properly proportioning the magnitude of condenser 23, relative to the magnitude of the resistive load 21, the amplitude of the oscillations developed across the resistive load 21 will be of very small magnitude.

The oscillatory circuit 13 is also designed to have a very narrow bandwidth and is sharply resonant; in this way, the locking range of the oscillations, responsive to an applied locking signal such as the carrier of an amplitude modulated carrier, will be very small. For optimum utilization of the present invention, this resonant frequency range and therefore the locking range of the oscillator is a small fraction of the total frequency range of the applied amplitude modulated carrier.

Let an amplitude modulated carrier having an in-phase component and a quadrature component be applied to the control grid of tube 11, and let the carrier frequency of the modulated carrier be substantially the frequency of oscillations developed in the oscillatory circuit 13. The amplitude modulated carrier may alternatively be introduced at other points in the electron stream provided that modulations in the electron stream or in the circuits coupled to tube 11 will have sufficient influence on the voltage developed at the control grid of tube 11 by the oscillatory circuit 13. The oscillations produced in the electron stream of tube 11 will thereupon become locked to the frequency and phase of the carrier of the intelligence modulated carrier. The signal at the control grid of tube 11 will therefore be a combination of the amplitude modulated carrier to which is added the carrier locked oscillation provided by the oscillatory circuit 13. By properly proportioning either the heater current or the anode voltage of tube 11, tube 11 may function with a characteristic curve having the previously mentioned "double limiting" characteristics and the phase of the oscillations will follow either exactly or very closely the phase of the carrier of the amplitude modulated carrier. The combined signal developed at the control grid of tube 11 will change in amplitude according to the envelope of the in-phase component of the amplitude modulated carrier. This combined signal will be rectified between the cathode and grid of tube 11. The grid leak circuit will thereupon produce a bias at the control grid of tube 11 which will follow the aforementioned in-phase component of the amplitude modulated carrier and thereby control the average current of the electron stream through tube 11 accordingly. This electron flow will pass through the resistive load 21 and therefore produce a voltage across this resistive load 21 which is representative of the demodulated intelligence. The demodulated intelligence is produced at the output terminal 25.

The operation of the oscillating in-phase detector of FIGURE 3 may also be described in terms of product detection; that is, in virtue of the fact that the plate-current grid-voltage characteristic curve of tube 11 has square law curvature, the intelligence modulated carrier and the developed oscillations (these developed oscillations being in phase with the in-phase component of the intelligence modulated carrier), will be mixed in the electron stream of tube 11 to provide product detection of only the in-phase component of the intelligence modulated carrier. If the intelligence modulated carrier is a vestigial sideband modulated signal, the demodulated intelligence will represent only the in-phase component and will not demodulate the quadrature component.

The oscillating in-phase detector of FIGURE 3 therefore does not follow the entire envelope of the vestigial sideband modulated signal but only its in-phase component. This feature of an oscillating in-phase detector of the present invention is a considerable improvement over a detector which requires a synchronization or locking bandwidth which includes all sideband frequencies of an applied amplitude modulated carrier and which therefore functions as a linear detector and follows the entire envelope of the amplitude modulated carrier. Detector circuits of the latter named type are not capable of demodulating only the in-phase component of, say, the vestigial sideband modulated carrier as is possible with the present invention and must necessarily also demodulate the quadrature component of the vestigial sideband modulated carrier which is an undesirable component.

The additional feature of the present invention, involving the use of a "double limiting" plate-current grid-voltage characteristic, provides that the detector of the present invention follows very closely the in-phase component of the carrier of a vestigial sideband signal in a manner not possible in an oscillator not designed to produce this type of operation.

The circuit of FIGURE 3 uniquely uses a single tube to provide product detection, self-developed oscillation and also amplification; a single tube circuit such as has been described in FIGURE 3 and also of the types which will be described later in the specification, provides product detection of modulated carrier intelligence in a manner which provides considerable circuit reliability, ease in alignment and simplicity of operation.

Figures 4, 5:
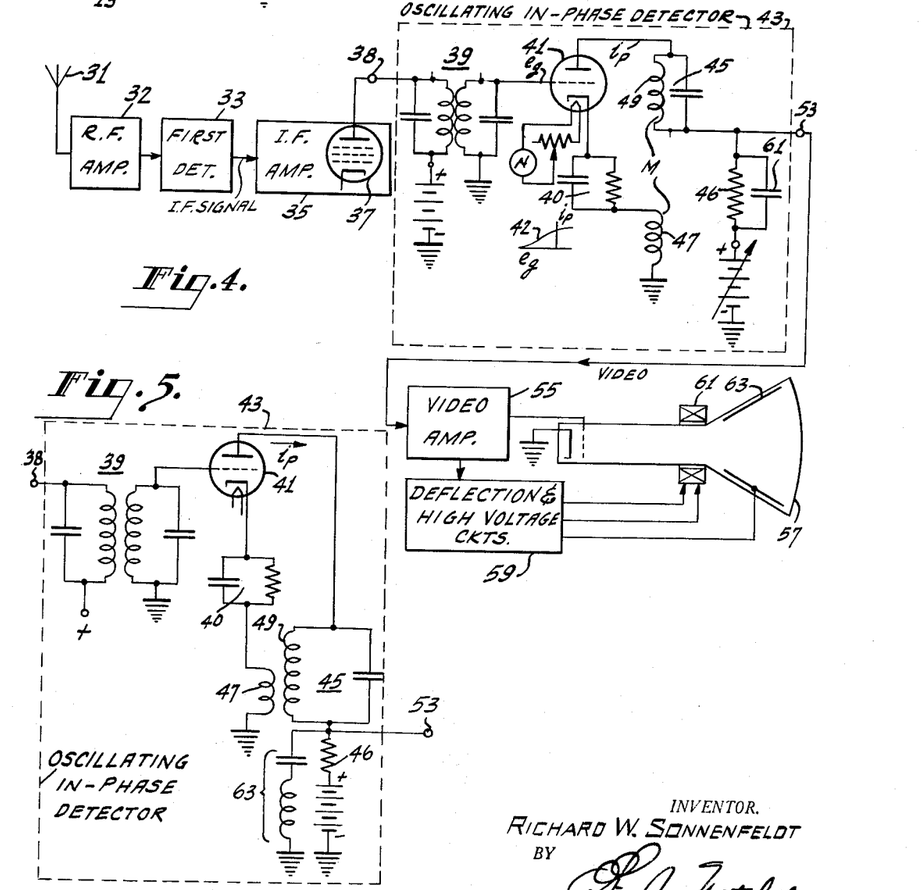
FIGURE 4 is a diagram of a television receiver using an oscillating in-phase detector of the present invention.
FIGURES 5, 6A, 7A and 8A are schematic diagrams of forms of oscillating in-phase detectors of the present invention.

FIGURE 4 is a diagram of a television receiver using an oscillating in-phase detector of the present invention for use as a second detector.

An incoming television signal representing either a monochrome image or a color image is received at the antenna 31 and applied by way of the RF amplifier 32 to the first detector 33. In the first detector 33, the television signal is subjected to a mixing operation and shifted in frequency to an intermediate frequency (I.F.) at which frequency the television signal is applied to the I.F. amplifier 35. The I.F. amplifier 35 is an amplifier which amplifies the television signal at the intermediate frequency. The I.F. amplifier includes a final stage having an electron tube 37. The anode of electron tube 37 is coupled to drive the transformer 39 which develops the I.F. signal between the control grid of tube 41 and ground. Tube 41 is the amplifier tube of the oscillating in-phase detector 43.

A parameter associated with tube 41, such as filament current, plate voltage or cathode-circuit resistance, is designed to provide a "double limiting" characteristic curve 18 which relates the plate current and grid voltage of tube 41.

Tube 41 is a triode whose anode is coupled to the tuned circuit 45 which is sharply resonant at the I.F. carrier frequency. The resonant circuit 45 is in series with an anode load resistor 46; condenser 61 is connected in shunt across the anode load resistor 46. The cathode of tube 41 is coupled to ground by way of the serially connected grid leak circuit 40 and coil 47. By providing inductive coupling of proper magnitude between coil 47 and the inductance 49 of the resonant circuit 45, oscillations at substantially the intermediate frequency carrier frequency are produced in the electron stream of tube 41 and developed therefrom across resonant circuit 45. A bias voltage, indicative of the amplitude of the oscillations is developed across the grid leak circuit 40; this bias voltage will control the magnitude of electron flow through tube 41 to produce a corresponding voltage across the output load resistor 46.

The intermediate frequency (I.F.) television signal, constituting a vestigial sideband video modulated carrier, hereinafter termed an I.F. video signal, is applied to the control grid of tube 41. This I.F. video signal will produce three actions in the circuit of tube 41; that is, the oscillations developed by tube 41 in conjunction with resonant circuit 45 and coil 47 will become phase locked to the phase and frequency of the I.F. signal carrier in the electron flow of tube 41; the locking bandwidth of the phase-locking action is large enough to include only the I.F. carrier signal and a composite signal comprising the I.F. video signal modulations in the electron stream of tube 41 in combination with the oscillator oscillations will be product detected in the electron stream. The resulting signal components from the product detection are rectified between the cathode and grid of tube 41 to produce the bias voltage across the grid leak circuit 40 which follows the in-phase component of the envelope of the I.F. video signal; this in-phase component is the desired video signal intelligence. The electron flow to the anode and therefrom through the load resistor 46 will be responsive to the variation in bias across grid leak circuit 40, and will therefore develop across the output load resistor 46 an amplified signal which follows the variation of bias and which therefore constitutes the detected video signal. The detected video signal is thereupon provided at the output terminal 53.

The detected video signal provided at the output terminal 53 is thereupon applied to the video amplifier 55. The amplified video signal is applied from the video amplifier 55 to a control electrode of the kinescope 57.

Deflection synchronizing signals are separated from the video signal in the deflection and high voltage circuit 59 which is coupled to the video amplifier 55. The separated picture deflection signals are thereupon utilized to develop horizontal and vertical deflection signals which are applied to the deflection yokes 61 and also a high voltage which is applied to the ultor 63 of the kinescope 57. As a result of the modulation of the electron beam of the kinescope 57 by the video signal and of the developing of horizontal and vertical deflection signals in the deflection yokes 61, the image corresponding to the video signal is reconstructed by the kinescope 57.

In the case of a color television signal, color components, also provided at the output of the oscillating in-phase detector of the invention are processed and applied to an appropriate color image reproducer.

The oscillating in-phase detector 43 of FIGURE 5 uses a circuit similar to that employed for the oscillating in-phase detector 43 of FIGURE 4. One feature of the oscillating in-phase detector 43 of FIGURE 5 is the use of a series resonant circuit 63 which is series resonant at the frequency of the I.F. carrier and therefore at the frequency of the oscillations provided in the tube 41. The series resonant circuit 63 is connected between the anode side of the plate resistance 46 and ground, and by-passes the oscillations developed by the oscillator to ground so that they are not developed across the anode resistor 46; only the demodulated intelligence resulting from the product detection is developed across the anode resistor 46 and thereupon provided at the output terminal 53. One advantage of the use of the series resonant circuit 63 is that the condenser of this circuit will have substantially less capacitance than the capacitance required for the condenser 61 of the oscillating in-phase detector 43 of FIGURE 4.

Figure 6A:
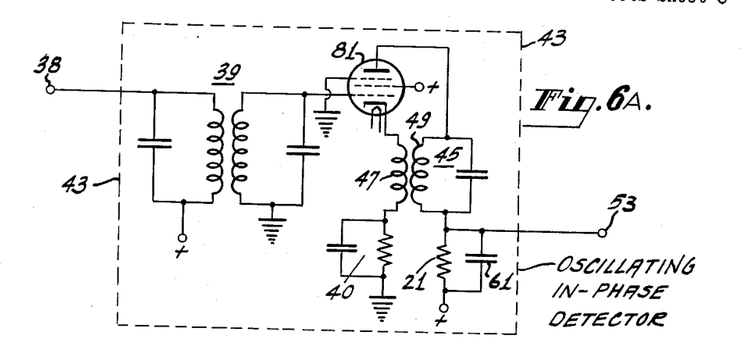
Figure 6B:
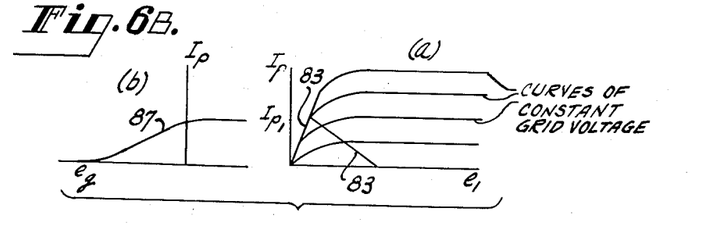
FIGURES 6B, 7B and 8B depict characteristic curves of the electron tubes of the corresponding oscillating in-phase detectors.

FIGURE 6A is a schematic diagram of an oscillating in-phase detector 43 which uses a pentode 81. The pentode 81 has characteristic curves of the type illustrated in FIGURE 6B. Diagram (a) of FIGURE 6B shows standard pentode characteristic curves, each of the curves relating to a value of constant grid voltage. A load line 83 as derived from a value of anode resistance, say the anode resistance 21 of the circuit of FIGURE 6A, is so positioned among the characteristic curves as to provide what is known as "plate bottoming." "Plate bottoming" is achieved in pentodes in virtue of the fact that as the values of grid voltage are changed to traverse the load line 83 to higher values of plate current, the line 85 which is common to the characteristic curves for most values of grid voltage will be reached and the amount of plate current cannot exceed the value of $i_{p1}$ which corresponds to the point of "plate bottoming." A clipping or limiting action therefore takes place in the pentode 81 and the dynamic plate current vs. grid voltage characteristic curve 87 includes regions at each end of the curve wherein clipping or limiting action of the plate current takes place. It is recognized that the characteristic curve 87 is a highly desirable characteristic curve for use in an oscillating in-phase detector of the present invention.

The oscillating in-phase detector 43 of FIGURE 6A thereupon locks to the carrier of the incoming video signal and produces product demodulation in the electron stream of the pentode 81 to provide for the demodulated intelligence at the output terminal 53 in the manner previously described in connection with the oscillating in-phase detector 43 of FIGURE 4.

Figure 7A:
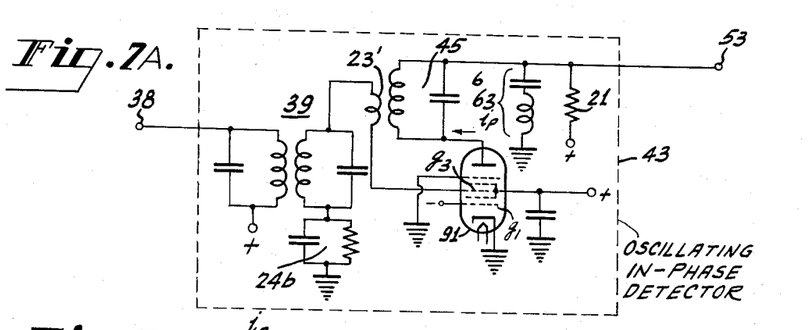

FIGURE 7A is a schematic diagram of an oscillating in-phase detector 43 of the present invention which uses a pentagrid converter tube 91; the pentagrid converter tube 91 is operatively connected as an oscillating in-phase detector to provide a so-called "double limiting" type of plate-current grid-voltage characteristic curve by use of which the benefits of the present invention may be derived.

Figure 7B:
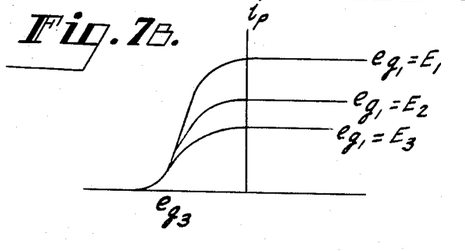

FIGURE 7B illustrates one family of plate-current grid-voltage characteristic curves of the pentagrid converter tube; these curves are characterized by the previously mentioned "double limiting" action. As is evident from the curves of FIGURE 7B, the plate-current $i_p$, as a function of the voltage $e_{g3}$, applied to the third grid $g_3$, is equal to zero beyond cut-off; $i_p$ increases with $e_{g3}$ increasing in a positive direction from cut-off to a point where the plate current $i_p$ becomes substantially constant for any further increase in $e_{g3}$. The family of curves shown depend upon the magnitude of the voltage $e_{g1}$ applied to the first control grid $g_1$.

The oscillating in-phase detector 43 of FIGURE 7A is operatively connected whereby the anode is coupled to a circuit substantially that shown and described in FIGURE 4. The intermediate frequency vestigial sideband signal is applied by way of the transformer 39 and the coil 23' to the third grid $g_3$ of the pentagrid converter tube 91. The secondary of the transformer 39 is connected to ground by way of the resistance condenser circuit 24b. The coil 23' is inductively coupled to the tuned resonant circuit 45 to provide a feedback signal from the anode to the third grid; this coil is designated as 23' and corresponds to the coil 47 of FIGURE 4. In like manner, the resistance condenser circuit 24b provides the biasing action which corresponds to the action similarly provided by the circuit 40 of FIGURE 4.

In the circuit of the oscillating in-phase detector 43 of FIGURE 7A, a fixed negative voltage is applied to the first grid $g_1$; the product-detected information from the intermediate frequency vestigial sideband signal is thereupon caused to be developed at the output terminal 53.

Figures 8A, 8B, 9A, 9B:
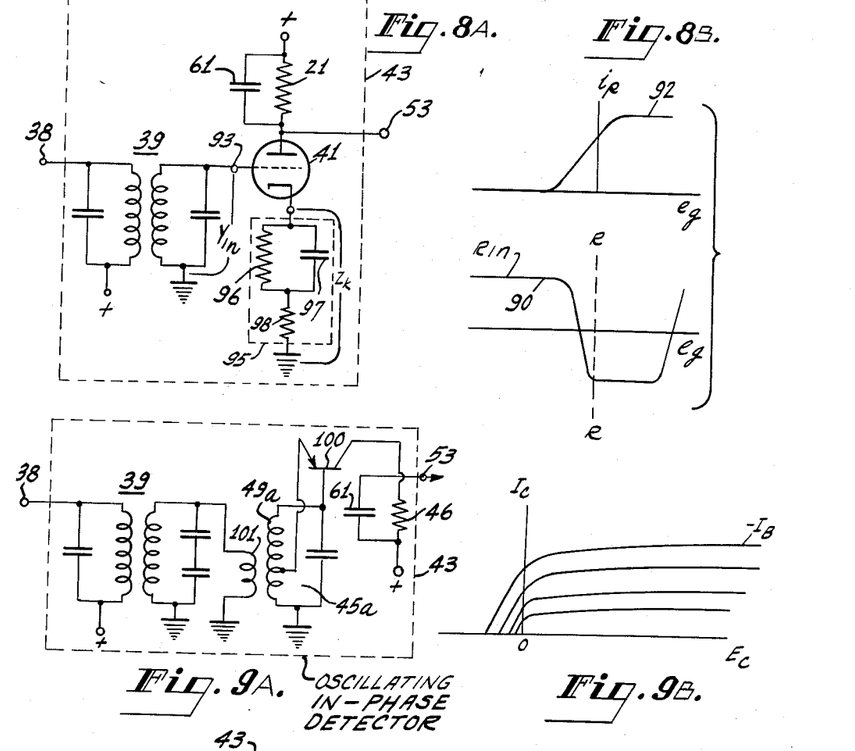
FIGURE 9A is a schematic diagram of a transistor type of oscillating in-phase detector of the present invention.
FIGURE 9B shows characteristic curves of a transistor which are pertinent to an understanding of the operation of the circuit of FIGURE 9A.

FIGURE 8A is a schematic diagram of another form of oscillating in-phase detector of the present invention. The oscillating in-phase detector 43 of FIGURE 8A does not require a coupling coil between the control grid and a tank circuit included in an output circuit such as employed in, for example, the oscillating in-phase detector 45 of FIGURE 4.

The circuit of FIGURE 8A includes an anode resistor 21 in shunt with the condenser 61; the aforementioned shunted circuit is connected between the anode of tube 41 and a source of positive potential. The anode is connected to the output terminal 53.

The secondary of the transformer 39 is connected between the control grid of tube 41 and ground. An admittance $Y_{in}$ is presented between the grid terminal 93 and ground by the tube 41. A cathode circuit 95, including a resistance 96 connected in shunt with a condenser 97, and a resistance 98 which is serially connected with the aforementioned shunt connected circuit, is coupled between the cathode of tube 41 and ground. The cathode circuit develops an impedance $Z_k$ between the cathode terminal 94 and ground. $Z_k$ is a complex number since it has both a resistive and a reactive component. As is derived in chapter XII of the book, "Electronic Circuits and Tubes" by Cruft electronics staff (McGraw-Hill 1947, the input admittance $Y_{in}$ is expressible as $$Y_{in}=jw[C_g-G+C_{gk}(1-A)] \qquad (1)$$

where $$A=\frac{g_m Z_k}{1+g_m Z_k} \qquad (2)$$

and $C_{gG}$ represents the capacitance from the control grid A of tube 41 to ground and $C_{gk}$ represents the interelectrode capacitance between grid and cathode of tube 41. "A" is a factor which is complex, a virtue of the fact that $Z_k$ is complex. $Y_{in}$ is therefore expressible by $$Y_{in}=G_{in}+jB_{in} \qquad (3)$$

The input impedance between terminal 93 and ground may therefore have the resistive component $R_{in}$ where $$R_{in}=\frac{G_{in}}{G_{in}+jB_{in}} \qquad (4)$$

A curve 90, relating $R_{in}$ to the grid voltage $e_g$, is diagrammed in FIGURE 8B; the curve 92, of FIGURE 8B relates the plate current to this voltage $e_g$. $R_{in}$ changes from positive resistance to a negative resistance at a value of grid voltage which will be dependent upon the parameters described in Equation 1; inasmuch as a feedback circuit is provided by the interelectrode capacitance $C_{gk}$ from the cathode to the control grid of tube 41, oscillations will be developed in that tube at a frequency prescribed by the resonant characteristics of the transformer 39 and in synchronism with the carrier of the intermediate frequency vestigal sideband signal developed at the input terminal 38. The resistor 98, which is included in the cathode circuit 95, provides the function of limiting the plate current for large values of grid voltage by causing the plate current to follow the potential of the grid; resistor 98 may therefore be considered as a parameter for providing constant current in regions of large grid voltage in the tube 41 thereby yielding the aforementioned "double limiting" type of grid-voltage plate-current characteristic curve of the present invention. Tube 41 will therefore produce (A) oscillations at the frequency of the carrier of the intermediate frequency vestigial sideband signal, (B) product detection of the vestigial sideband signal to develop the product-detected vestigial sideband information across the anode resistance 21 and thereby provided at the output terminal 53.

Another form of oscillating in-phase detector of the present invention is the transistor type of circuit shown in FIGURE 9A. A transistor is ideally adapted for use in an oscillating in-phase detector of the present invention for the reason that a transistor is capable of high transconductance and of sharp cut-off and saturation characteristics.

A typical set of current and voltage characteristics of a transistor showing the double-clipped action which is used in the present invention are shown in FIGURE 9B; there it is shown that the collector current $I_c$ becomes substantially saturated as a function of the collector voltage $E_c$ for various values of the base current $I_B$. These characteristic curves result from the fact that the current carriers of the transistor, passing through the base layer to the collector, travel by diffusion instead of being attracted by an electrostatic field as in the case of a vacuum tube. The collector voltage $E_c$, therefore has little effect on collector current $I_c$ as long as this voltage is sufficient to attract the carrier that has reached the collector junction.

The oscillating in-phase detector circuit shown in FIGURE 9A, includes a transistor 100. A resonant circuit 45a, corresponding to the circuit 45 of the oscillating in-phase detector 43 of FIGURE 4, is connected between the base of the transistor 100 and ground. The emitter is coupled to a tap on the inductance 49a of the resonant circuit 45a. The collector of the transistor 100 is connected to an output circuit consisting of the output resistor 46; the output resistor 46 is shunted by the capacitance 61. The intermediate-frequency signal from the I.F. amplifier output terminal 38 is applied to the circuit 39 and applied therefrom to the resonant circuit 45a by way of the inductance 101 which is inductively coupled to the inductance 49a of the resonant circuit 45a. Oscillations will be developed by the transistor 100; these oscillations will be locked in-phase with the carrier component of the intermediate frequency video signal using locking bandwidth narrow enough to include only the carrier frequency. Product detection between intermediate frequency video signal and the carrier phase-locked oscillations will take place in the transistor 100 and the demodulated video information, resulting from the product detection will be developed across the output resistor 46 and therefrom at the output terminal 53.

The in-phase oscillating detector 43 of FIGURE 9A has shown one type of transistor circuit of the present invention which has been successfully operated with optimum performance. It is to be appreciated that alternative connections may also be used, making use of the sharp cut-off and saturation characteristics of the transistor and also of the ability of a transistor oscillator to be in-phase locked to the carrier of an applied intermediate frequency video signal in the transistor.

Figure 10:
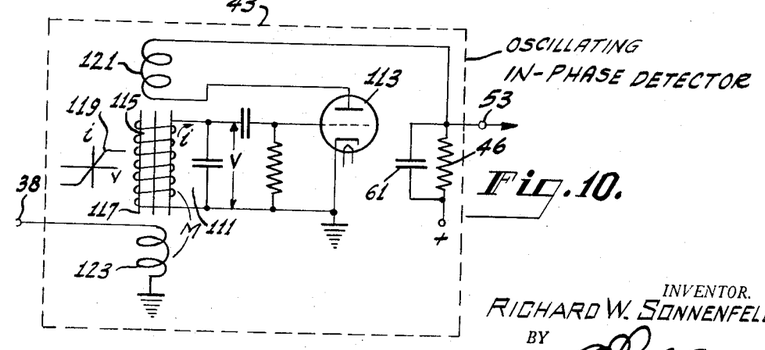
FIGURES 10–12 are schematic diagrams of oscillating in-phase detectors using non-linear circuits in conjunction with the oscillator tank circuits to provide a "double-limiting action."
Figure 11:
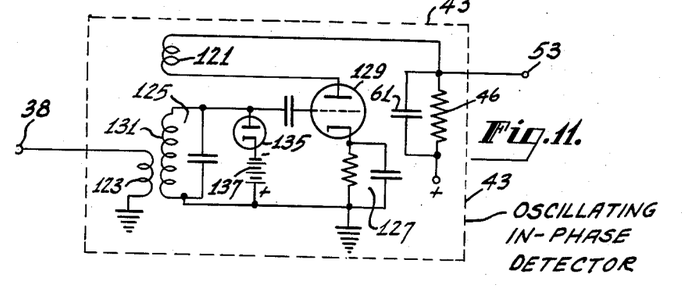
Figure 12:
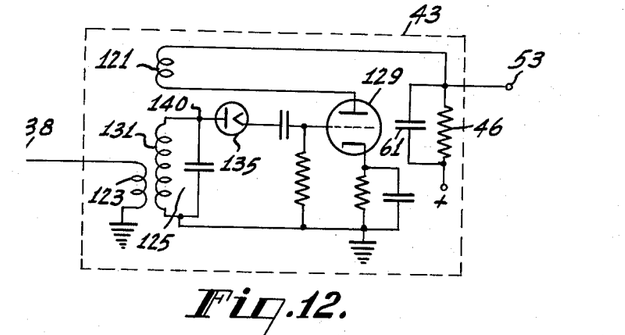

The circuit diagrams of FIGURES 10, 11, and 12 represent embodiments of the present invention wherein non-linear circuit elements, in addition to an amplifier device, provide the double limiting action which permits an oscillating in-phase detector of the present invention to operate so that the oscillations are carrier phase locked or synchronized in the electron stream of the amplifier device.

In the oscillating in-phase detector 43 of FIGURE 10, a tank circuit 111 is coupled between the cathode and control grid of the vacuum tube 113. The tank circuit 111 is a narrow band tank circuit which is resonant at substantially the frequency of an applied intermediate frequency video signal; the tank circuit 111 includes a saturable inductance 115 which has an iron core 117. The saturable inductance 115, operating in conjunction with the iron core 117 has a current $i$ versus voltage V curve 119; according to curve 119, as the voltage V across the saturable inductance 115 increases in either polarity the current $i$ through the saturable inductance 115 will be seen to saturate. If the vacuum tube 113 is connected whereby feedback from the anode is provided to the tank circuit 111 by way of the feedback coil 121, oscillations will be produced at the frequency of resonance of the tank circuit 111. In virtue of the saturable characteristics of the tank circuit 111, the current through the saturable inductance 115 will be unable to increase when the control grid of the vacuum tube 113 goes positive, therefore producing a corresponding limiting action in the current flowing between the anode and the control grid of that tube. Thus, the oscillator involving the vacuum tube 113 and the tank circuit 111 will oscillate with the double limiting characteristic already described in the specifications.

An intermediate frequency video signal applied by way of the terminal 38 to a inductance 123 which is inductively coupled to the saturable inductor 115, will cause the oscillations to be locked to the intermediate frequency video signal. Product detection of the video signal will therefore be provided in the vacuum tube 113; the detected video signal will thereupon cross the output resistor 46 at the output terminal 53.

A pair of different oscillating in-phase detector circuits, using oscillators which have been adapted to provide a double clipping or limiting action by use of non-linear circuit elements which are separate from an oscillator tube, are shown in FIGURES 11 and 12.

In the oscillating in-phase detector 43 of FIGURE 11 a tank circuit 125 is connected, using a bias circuit 127, between the cathode and control grid of an oscillator tube 129. A feedback coil 121, connected to the anode of the tube 129 is coupled to an inductance 131 of the tank circuit 125; by employing a proper amount of inductive coupling between the feedback coil 121 and the inductance 131, oscillations are thereupon developed in the electron stream of tube 129.

An intermediate frequency video signal is applied from the input terminal 138 to the inductance 123 which is inductively coupled to the inductance 131 of the tank circuit 125. The oscillations developed in the oscillator tube 129, for reasons to be discussed below, are thereupon caused to be locked to the in-phase component of the carrier of the applied intermediate frequency video signal; product detection of the video signal thereupon takes place in the electron stream of the tube 129 with the demodulated video signal developed across the resistive load 46 and therefrom at the output terminal 53.

In order that the oscillations developed in the oscillator tube 129 are caused to be synchronized with the carrier of the applied intermediate frequency video signal in the electron stream of tube 129, the oscillator is caused to have the previously discussed double clipping action by employing diode 135 which is connected in series with a potential source 137, and with the resulting serially connected circuit connected in shunt with the tank circuit 125. The diode 135 conducts and therefore both loads the tank circuit 125 and limits the voltage applied between the control grid and cathode of tube 129 when the amplitude of each cycle of the oscillations developed in the tank circuit 125 rises above a value prescribed by the amount of voltage developed by the potential source 137. Since the value of voltage developed between the control grid and cathode of tube 129 is prevented from rising above a prescribed point of each cycle of the oscillation developed in the electron stream of that tube, a double-limiting action is provided to the electron stream to therefore yield the optimum performance of a circuit of the present invention for product detection.

FIGURE 12 is an oscillating in-phase detector of a type similar to that circuit shown in FIGURE 11, with the exception that the diode 135 is connected between the off-ground terminal 140 of the tank circuit 125 and the control grid of tube 129. The polarity of the diode is such that when the amplitude of the oscillations developed between the terminal 140 and the cathode of tube 129 exceeds a prescribed potential, the diode 135 conducts and the cathode of tube 129 is clamped to a voltage in the vicinity of a ground potential thereby again causing a limiting action of the tube current during excursions of the voltage developed across the tank circuit 125.

While the diodes 135 have been employed in the circuits of FIGURES 11 and 12 to provide the benefits of the present invention, it is to be appreciated that other devices yielding rectifying action may alternatively be used.

All of the circuits of the present invention described heretofore in the present application have discussed embodiments of an oscillating in-phase detector of the present invention using oscillation circuits which, when free running provide sinusoidal waves. Oscillating in-phase detectors of the present invention are not limited, circuitwise to such types of oscillatory circuits, but may indeed include circuits of the multivibrator type. A multivibrator is a circuit using one or more electron flow devices, which in virtue of bi-stable action provided in one or more devices of the circuit, cause a switching action back and forth between each of two states of operation or two values of electron flow; a multivibrator circuit thereupon provides a true double limiting action since one or more of the associated electron flow devices are caused to be either cut-off or to have a substantially constant value of current in each of several portions of a cycle of oscillation. A multivibrator is also uniquely adapted for use in oscillating in-phase detectors of the present invention in virtue of the fact that because of the double clipping action and by reason of the unique manner in which bi-stable action is employed to develop oscillations, a multivibrator will readily synchronize to the component of an applied vestigial sideband amplitude modulated wave in the electron flow of the amplifier device of the multivibrator.

Figure 13A:
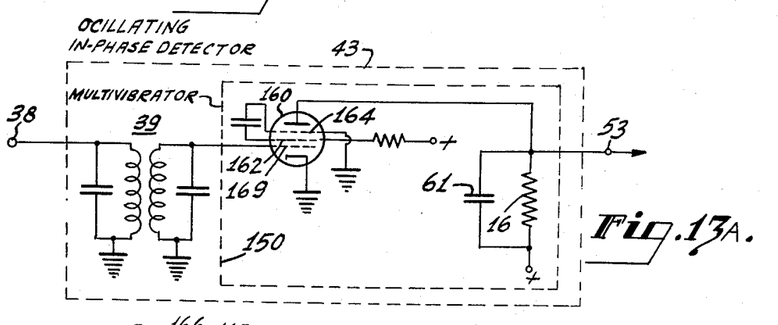
FIGURE 13A is a schematic diagram of a multivibrator type of oscillating in-phase detector.

The oscillating in-phase detector 43 of FIGURE 13A is a multivibrator circuit of the present invention. This oscillating in-phase detector 43 uses a multivibrator 150 to which is applied the intermediate frequency video signal from terminal 38 by way of the band-pass circuit 39. The multivibrator 150 is adapted to optimally provide free running switching action at a frequency in the vicinity of the intermediate frequency video signal carrier; the applying of the intermediate frequency video signal to the oscillating multivibrator 150 thereupon causes the multivibrator to lock its switching action in-phase with the carrier of the applied intermediate frequency video signal; product detection of the intermediate video signal is accomplished in one or more of the electron tubes or electron flow devices of the multivibrator 150 and the demodulated video signal is provided at the output terminal 53. The multivibrator circuit, enclosed in the dash line box assigned the legend "multivibrator" and the numeral 150 in FIGURE 13A. is a circuit which illustrates one form of multivibrator circuit which accomplishes carrier-phase locking and the product detection action of the present invention. The particular multivibrator circuit shown in FIGURE 13A is very simple, using a single electron tube 160; it is to be appreciated however, that other types of circuits may also be employed.

Figure 13B:
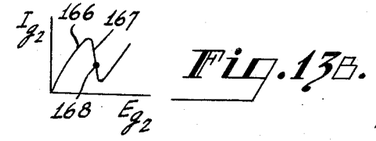
FIGURE 13B is a characteristic curve relating the current of one of the grids to the voltage applied to that grid of the tube used in the detector of FIGURE 13A.

The circuit embodying the multivibrator 150 of FIGURE 13A is a transitron oscillator circuit which is caused to function in virtue of a bi-stable characteristic curve which is representative of the grid-voltage relationships related to the second grid 162. When the third grid 164 of the tube 160 is connected to ground or to a potential which is substantially at ground, the characteristic curve relating the current $I_{g2}$ to the second grid 162 to the voltage $E_{g2}$ applied to that second grid is a characteristic curve 166 shown in FIGURE 13B. This characteristic curve 166 is seen to have a negative static characteristic curve 167 about an operating point 168.

The general theory of transitron oscillators which use a characteristic curve of a type similar to the characteristic curve 166 is described by Brunetti in an article entitled "The Transitron Oscillator" published in the Proceedings of the IRE, February 1939.

In the multivibrator 150 of FIGURE 13A the intermediate frequency video signal is applied to the first control grid 169 of tube 160. Multivibrator action derived from the transitron characteristics, previously described, causes multivibrator type of oscillations to be developed in the electron screen of tube 160. These multivibrator oscillations will be locked in-phase to the carrier of the intermediate frequency video signal which is applied to the first control grid 169; product detection between the in-phase multivibrator oscillations and the intermediate frequency video signal will take place in the electron tube 160 with the product detection causing the developing of the detected video signal across the load resistor 46 and therefrom to the output terminal 53.

Having described the invention, what is claimed is:

1. In a receiver adapted to provide a carrier which is amplitude modulated by signal intelligence, said carrier having a prescribed frequency and phase, the amplitude modulation of said carrier by said signal intelligence producing a vestigial sideband amplitude modulated carrier having a first and wide frequency bandwidth and an in-phase component of said amplitude modulated carrier which constitutes said signal intelligence and which can be demodulated by product detection of said amplitude modulated carrier using oscillations having the frequency and phase of said carrier, a detector circuit comprising a combination: an electron flow means having flow control electrodes; a circuit connected to said electron flow means to cause oscillations to be developed in said electron flow at substantially the frequency of said carrier and to cause a voltage applied to at least one of said electrodes to produce an electron flow having at least two ranges of said applied voltage where no appreciable change in the intensity of electron flow for a corresponding change in applied voltage occurs, said circuit including apparatus capable of causing said amplitude modulated carrier when applied to said circuit and introduced into said electron flow to lock said oscillations in said electron flow to the frequency and phase of said carrier with a locking bandwidth having a frequency range substantially smaller than said first bandwidth and comprising a narrow bandwidth including principally said carrier; means to apply said amplitude modulated carrier to said circuit and therefrom into said electron flow whereby product detection of said amplitude modulated carrier is caused in said electron flow by said oscillations; said circuit including apparatus responsive to said product detection in said electron flow to develop the in-phase component of said amplitude modulated carrier and therefore the demodulated signal intelligence.

2. An oscillating in-phase detector circuit comprising a combination: an electron flow means having a flow control electrode; a circuit connected to said electron flow means to cause oscillations to be developed in said electron flow at a prescribed frequency and capable of causing a voltage applied to said flow control electrode to produce electron flow having at least one range of said voltage wherein said electron flow is cut off and another range normally traversed during oscillation where no appreciable change in electron flow for a corresponding change in said applied voltage occurs, said circuit thereby being capable of causing phase locking in said electron flow between said oscillations and the carrier of an amplitude modulated carrier applied to said circuit, said carrier having said prescribed frequency, a source of an amplitude modulated carrier having asymmetrical sidebands flanking a carrier having said prescribed frequency and having an in-phase component capable of being product detected by oscillations which are in-phase with said carrier, said circuit including means to provide a locking range comprising a narrow bandwidth including principally the carrier region of said amplitude modulated wave; means to apply said amplitude modulated carrier to said circuit and therefrom into said electron flow whereby carrier synchronization of said oscillations and product detection of said amplitude modulated carrier is caused in said electron flow by said oscillations; apparatus coupled to said electron flow and responsive to said product detection in said electron flow to develop a voltage which is proportional to the in-phase component of said amplitude modulated carrier.

3. An oscillating in-phase detector circuit comprising in combination a source of an amplitude modulated carrier having a carrier frequency and a set of side frequencies in a first bandwidth, said amplitude modulated carrier having signal intelligence included in said side frequencies which is capable of being demodulated by product detection using an oscillation which is synchronized to said carrier; an electron flow means having an electron flow controllable between either of two states of electron flow by a flow control means; a frequency sensitive circuit means sharply resonant to the frequency of the carrier of said amplitude modulated carrier and connected to said flow control means; circuit means coupled to said source and to said electron flow means to apply said amplitude modulated carrier to said flow control means and to produce oscillations representative of both said amplitude modulated carrier and of locally generated oscillations which are synchronized to the phase and frequency of said carrier of said electron flow to cause the product detection of said in-phase component of said amplitude modulated carrier thereby causing variations of said electron flow corresponding to said signal intelligence; and means coupled to said electron flow means and responsive to said variations of electron flow to produce a voltage indicative of said signal intelligence.

4. An oscillating in-phase detector circuit comprising in combination: a source of an amplitude modulated carrier having a carrier frequency and a set of side frequencies in a first bandwidth, said amplitude modulated carrier having signal intelligence included in said side frequencies which is capable of being demodulated by product detection using an oscillation which is synchronized to said carrier; an oscillator including an oscillatory circuit and an electron flow means, said oscillatory circuit including a frequency determining element having a bandwidth which is substantially smaller than said first bandwidth and which is sharply resonant at the frequency of said carrier in said amplitude modulated carrier, said oscillatory circuit including apparatus for causing oscillations produced by said oscillator to be locked in-phase to the phase of any signal introduced into said electron flow having the frequency of said frequency determining element, said locking in-phase to comprise a phase locking of the oscillator oscillations in the electron flow at the phase of said introduced signal having said carrier frequency as it occurs in said electron flow; means to operatively connect said amplitude modulated carrier source to said oscillator to cause said amplitude modulated carrier to be introduced to said electron flow and to cause said oscillations to be locked in synchronism with said carrier in said electron flow thereby to cause modulation products of said oscillations and of said amplitude modulated carrier to be developed in said electron flow, one of said modulation products constituting demodulating signal intelligence in-phase with said carrier in said amplitude modulated waves; an output circuit included in said oscillatory circuit and responsive to said demodulated signal intelligence in said electron flow to produce a voltage representative of said signal intelligence.

5. An oscillating in-phase detector comprising in combination, a source of a modulated carrier comprising a carrier having a first frequency and including sidebands representative of signal intelligence, said modulated carrier having an in-phase component of signal intelligence capable of being demodulated by product demodulation of said modulated carrier by an oscillation which is synchronized to said carrier, a transistor having a collector, emitter and base electrode, an oscillator circuit including a resonant circuit connected between said collector and said base electrode to develop oscillations at substantially the frequency of said carrier, said resonant circuit having a resonant frequency at the frequency of said carrier, said oscillator including means to cause said oscillator to be capable of only being synchronized to an applied oscillation having a frequency substantially equal to the carrier frequency of said modulated carrier, output load and biasing means connected to said collector, means to apply said modulated carrier to said oscillator circuit to cause the oscillations developed therein to be locked in synchronism with the carrier of said modulated carrier and to cause product modulation of said modulated carrier by said oscillations in said transistor to produce the in-phase component of said signal intelligence across said output load.

6. An oscillating in-phase detector comprising in combination, a source of a modulated carrier comprising a carrier having a first frequency and including sidebands representative of signal intelligence, said modulated carrier having an in-phase component of signal intelligence capable of being demodulated by product modulation of said modulated carrier by an oscillation which is synchronized to said carrier, a semi-conductor amplifier having a plurality of electrodes, an oscillator circuit means including a resonant circuit coupled between selected electrodes of said semi-conductor amplifier to develop oscillations at substantially the frequency of said carrier, said resonant circuit having a resonant frequency at substantially the frequency of said carrier, said oscillator circuit including means to cause said oscillator to be capable of only being synchronized to an applied oscillation or signal having a frequency substantially equal to the carrier frequency of said modulated carrier, load and biasing means connected to electrodes of said semi-conductor amplifier to produce the condition whereby current into said output load will saturate when voltages applied to others of said electrodes exceed a prescribed voltage level, means to apply said modulated carrier to said oscillator circuit to cause said oscillations to be synchronized to said carrier component of said modulated carrier and to have a lock-in range which includes substantially only the frequency range in the vicinity of said carrier of said modulated carrier, said semi-conductor amplifier thereby causing an interaction of said modulated carrier in said oscillations to cause detection of said signal intelligence thereby developing a voltage indicative of said signal intelligence across said output load.

7. An oscillating in-phase detector comprising in combination, a source of a modulated carrier comprising a carrier having a first frequency and including sidebands representative of signal intelligence, said modulated carrier having an in-phase component of signal intelligence capable of being demodulated by product detection of said modulated carrier using an oscillation which is synchronized to said carrier, an electron tube having an anode, cathode and control grid and capable of producing an electron stream from said cathode to said anode, said electron stream being controllable by said control grid, oscillator circuit means including both a resonant circuit having sharp resonance at the frequency of said carrier and also a bias circuit coupled between said cathode and said control grid, said oscillator circuit means also including a feedback circuit from said anode to said control grid to cause oscillations having substantially the frequency of said carrier to be developed, said resonant circuit having a frequency bandwidth suitable to provide a lock-in band-width whereby said oscillator circuit means is capable of locking only to a signal having substantially the frequency of the carrier upon the application of said carrier to said oscillator circuit means, said oscillator circuit means and said electron tube including circuit and potential means to cause said electron tube to function whereby the characteristic curve relating the electron stream intensity to the potential of said control grid has a first and second region where a change of grid potential does not cause a corresponding change in intensity of said electron stream, an output load coupled to said anode, by-pass circuit means coupled to said output load to prevent signals at carrier frequency from developing appreciable voltage across said output load, means to apply said modulated carrier to said oscillator circuit means to cause said oscillations to be synchronized to the carrier of said modulated carrier in said electron stream and to produce an interaction in said electron stream between said carrier synchronized oscillations and said modulated carrier which results in product detection of said modulated carrier thereby causing variations of said electron stream which are proportional to said in-phase component of said signal intelligence, said variations in the intensity of electron stream corresponding to the in-phase component of said signal intelligence thereby producing a corresponding voltage variation across said output load.

8. An oscillating in-phase detector circuit comprising in combination a source of a modulated carrier comprising a carrier having a frequency and including sidebands representative of signal intelligence, said modulated carrier having an in-phase component of said signal intelligence capable of being demodulated by product modulation of said modulated carrier using an oscillation which is synchronized to said carrier, an electron flow means having controllable electron flow and having bi-stable characteristics whereby said controllable electron flow is capable of being switched to each of two conditions of electron flow, circuit means coupled with said electron flow means employing said bi-stable characteristics to produce alternate switching between said two conditions of electron flow at a frequency corresponding to the frequency of the carrier of said modulated carrier and capable of being synchronized to a signal having the frequency of said carrier which may be applied to said circuit means, means to apply said modulated carrier to said circuit means to cause said alternating switching to be synchronized in said electron flow to said carrier and to provide interaction of components of electron flow developed by said alternating switching of said electron flow and said modulated carrier to cause said electron flow to vary according to said in-phase component of said signal intelligence, an output circuit means coupled to said electron flow means and responsive to said last named variations of electron flow to produce a voltage corresponding to said in-phase component of said signal intelligence.

9. An oscillating in-phase detector circuit comprising in combination a source of a modulated carrier comprising a carrier having a frequency and including sidebands representative of signal intelligence, said modulated carrier having an in-phase component of said signal intelligence capable of being demodulated by product modulation of said modulated carrier using an oscillation which is synchronized to said carrier, an electron flow means having controllable electron flow controlled by electrodes, an oscillator circuit means including a resonant circuit which is connected to selected electrodes of said electron flow means to develop oscillations at substantially the frequency of said carrier, said resonant circuit having a bandwidth which is narrow band to include a frequency substantially equal to said carrier frequency, said oscillator means including a non-linear device means for restricting the intensity of electron flow when oscillations developed in said resonant circuit exceed a prescribed value, said oscillator circuit including biasing and potential means to cause said oscillator circuit to be capable of being synchronized by an applied signal which has a frequency substantially equal to said carrier frequency, means to apply said modulated carrier to said oscillator circuit to cause said oscillations to be synchronized to said carrier of said modulated carrier in said electron flow and to develop from interactions of said carrier synchronized oscillations and of said modulated carrier in said electron flow a variation of said electron flow which is proportional to the in-phase component of said signal intelligence, circuit means coupled to said electron flow means and responsive to said last named variation of electron flow to develop a voltage which is proportional to said in-phase component of said signal intelligence.

10. An oscillating in-phase detector circuit comprising a combination: an electron flow means; a circuit connected to said electron flow means to cause oscillations to be developed in said electron flow at a prescribed frequency, said circuit including a resonant circuit having a saturable inductance to produce an electron flow having at least one range of amplitudes of said oscillations where said electron flow is at a first intensity and a second range where said electron flow is at a second intensity, said circuit thereby being capable of causing phase locking in said electron flow between said oscillations and the carrier of an amplitude modulated carrier applied to said circuit, said carrier having said prescribed frequency, a source of an amplitude modulated carrier having asymmetrical sidebands flanking a carrier having said prescribed frequency and having an in-phase component capable of being product detected by oscillations which are in-phase with said carrier, said circuit including means to provide a locking range comprising a narrow bandwidth including principally the carrier region of said amplitude modulated wave; means to apply said amplitude modulated carrier to said circuit and therefrom into said electron flow whereby carrier synchronization of said oscillations and product detection of said amplitude modulated carrier is caused in said electron flow by said oscillations; apparatus coupled to said electron flow and responsive to said product detection in said electron flow to develop a voltage which is proportional to the in-phase component of said amplitude modulated carrier.

11. An oscillating in-phase detector circuit comprising a combination: an electron flow means, a circuit connected to said electron flow means to cause oscillations to be developed in said electron flow at a prescribed frequency, said circuit including a tank circuit having said prescribed frequency and including a rectifier device coupled to said tank circuit and to said electron flow means whereby said electron flow has one intensity for at least one range of oscillation amplitudes and a second intensity for a second range of oscillation amplitudes, said circuit thereby being capable of causing phase locking in said electron flow between said oscillations and the carrier of an amplitude modulated carrier applied to said circuit, said carrier having said prescribed frequency, a source of an amplitude modulated carrier having asymmetrical sidebands flanking a carrier having said prescribed frequency and having an in-phase component capable of being product detected by oscillations which are in-phase with said carrier, said circuit including means to provide a locking range comprising a narrow bandwidth including principally the carrier region of said amplitude modulated wave; means to apply said amplitude modulated carrier to said circuit and therefrom into said electron flow whereby carrier synchronization of said oscillations and product detection of said amplitude modulated carrier is caused in said electron flow by said oscillations; apparatus coupled to said electron flow and responsive to said product detection in said electron flow to develop a voltage which is proportional to the in-phase component of said amplitude modulated carrier.

12. An oscillating in-phase detector comprising in combination, a source of a modulated carrier comprising a carrier having a first frequency and including sidebands representative of signal intelligence, said modulated carrier having an in-phase component of signal intelligence capable of being demodulated by product detection of said modulated carrier using an oscillation which is synchronized to said carrier, an electron tube having an anode, filament, cathode and control grid and capable of producing an electron stream from said cathode to said anode depending upon filament power applied to said filament, said electron stream controllable by said control grid, oscillator circuit means including both a resonant circuit having sharp resonance at the frequency of said carrier and also a bias circuit coupled between said cathode and said control grid, said oscillator circuit means also including a feedback circuit from said anode to said control grid to cause oscillations having substantially the frequency of said carrier to be developed, said resonant circuit having a frequency bandwidth suitable to provide a lock-in bandwidth which said oscillator circuit means is capable of locking only to a signal having substantially the frequency of the carrier upon the application of said signal to said oscillator circuit means, said oscillator and electron tube including a filament power source and circuit and potential means operatively connected to said electron tube to cause said electron tube to function whereby the characteristic curve relating the electron stream intensity to the potential of said control grid has a first region where said electron stream is cut off and a second region where said electron stream is saturated, an output load coupled to said anode and including said oscillator circuit means, by-pass circuit means coupled to said output load to prevent signals at carrier frequency from developing appreciable voltage across said output load, means to apply said modulated carrier to said oscillator circuit means to cause said oscillations to be synchronized to the carrier of said modulated carrier in said electron stream and to produce an interaction in said electron stream between said carrier synchronized oscillations and said modulated carrier which results in product detection of said modulated carrier thereby causing variations of said electron stream which are proportional to said in-phase component of said signal intelligence, said variations in the intensity of electron stream corresponding to the in-phase component of said signal intelligence thereby producing a corresponding voltage variation across said output load.

13. An oscillating in-phase detector circuit comprising in combination a source of a vestigial sideband amplitude modulated carrier having a carrier frequency and a set of side frequencies in a first bandwith, said vestigial sideband amplitude modulated carrier having an in-phase component representative of signal intelligence which is capable of being demodulated by product detection using an oscillation which is synchronized to said carrier; an electron flow means having an electron flow controllable between cut-off and a constant-current state of electron flow by a flow control means; an oscillatory circuit including a frequency sensitive circuit means sharply resonant to the frequency of the carrier of said vestigial sideband amplitude modulated carrier and connected to said flow control means to cause oscillations having carrier to be generated in said electron flow, said frequency sensitive circuit having a bandwidth to provide an oscillation locking-bandwidth which is limited to substantially the frequency of said carrier; circuit means coupled to said source and to said oscillatory circuit to apply said amplitude modulated carrier to said flow control means and to produce modulations in the intensity of said electron flow which are representative of both said amplitude modulated carrier and of locally generated oscillations produced in said frequency sensitive circuit means which are synchronized to said carrier at the phase and frequency of said carrier at the point of said electron flow to therein cause the product detection of said in-phase component of said amplitude modulated carrier in said electron flow and to produce variations of said electron flow corresponding to said signal intelligence; and means coupled to said electron flow means and responsive to said variations of electron flow to produce a voltage indicative of said signal intelligence.

14. An oscillating in-phase detector circuit comprising in combination: a source of a vestigial sideband modulated carrier comprising a carrier having a first frequency and including sidebands asymmetrically flanking side carrier in a bandwidth, said modulated carrier having an in-phase component of signal intelligence capable of being demodulated by product detection of said modulated carrier in a non-linear means using an oscillation which is in-phase with said carrier; an electron flow means having controllable electron flow and having non-linear characteristics; an oscillatory circuit connected to said electron flow means to cause oscillations to be developed in the electron flow of said electron flow means at substantially the frequency of said carrier with said electron flow having at least two ranges of intensity where no appreciable change in intensity of electron flow responsive to a corresponding change in an applied voltage occurs, said oscillatory circuit including apparatus capable of causing said amplitude modulated carrier when applied to said circuit and introduced into said electron flow to lock said oscillations in said electron flow to the phase of said carrier with a locking bandwidth having a frequency range substantially smaller than the bandwidth of said vestigial sideband amplitude modulated carrier and comprising a narrow bandwidth which includes principally the frequency of said carrier; means to apply said vestigial sideband amplitude modulated carrier to said circuit and therefrom into said electron flow whereby said oscillations are locked into phase with said carrier in said electron flow and product detection of said vestigial sideband amplitude modulated carrier is caused in said electron flow by said oscillations in virtue of the non-linear characteristics of said electron flow means; apparatus coupled to said electron flow means and responsive to said product detection to develop a voltage which is proportional to the in-phase components of said vestigial sideband amplitude modulated carrier.

15. An oscillating in-phase detector comprising in combination, a source of a modulated carrier comprising a carrier having a first frequency and including sidebands representative of signal intelligence, said modulated carrier having an in-phase component of signal intelligence capable of being demodulated by product detection of said modulated carrier using an oscillation which is synchronized to said carrier, an electron tube having an anode, cathode and control grid and capable of producing an electron stream from said cathode to said anode, said electron stream controllable by said control grid, a fixed potential point, a resonant circuit having sharp resonance at the frequency of said carrier coupled between said control grid and said fixed potential point, a resistance condenser network coupled between said cathode and said fixed potential point, to cause oscillations having substantially the frequency of said carrier to be developed, said resonant circuit having a frequency bandwidth suitable to provide a lock-in bandwidth which said oscillator circuit means is capable of locking only to a signal having substantially the frequency of the carrier upon the application of said signal to said oscillator circuit means, said resistance condenser network further proportioned to cause the characteristic curve relating the electron stream intensity to the potential of said control grid has a first and second region where a change of grid potential does not cause a corresponding change in intensity of said electron stream, an output load coupled to said anode, by-pass circuit means coupled to said output load to prevent signals at carrier frequency from developing appreciable voltage across said output load, means to apply said modulated carrier to said resonant circuit means and therefrom to said control grid to cause said oscillations to be synchronized to the carrier of said modulated carrier in said electron stream and to produce an interaction in said electron stream between said carrier synchronized oscillations and said modulated carrier which results in product detection of said modulated carrier thereby causing variations of said electron stream which are proportional to said in-phase component of said signal intelligence, said variations in the intensity of electron stream corresponding to the in-phase component of said signal intelligence thereby producing a corresponding voltage variation across said output load.

16. A detector circuit comprising a combination: an electron flow means having controllable electron flow and electron flow control electrodes; a circuit connected to said electron flow means to cause oscillations to be developed in said electron flow at a prescribed frequency and capable of having a voltage applied to at least one of said electrodes cause said electron flow to have at least two ranges of said voltage where the transconductance of said electron flow means is substantially zero and a value of voltage intermediate between said two ranges of said voltage where said transconductance is maximum, said circuit including apparatus to apply an amplitude modulated carrier to said circuit and therefrom into said electron flow to phase synchronize said oscillations in said electron flow to phase synchronize said oscillations in said electron flow to the carrier component of said amplitude modulated carrier with a locking bandwidth having a frequency range including substantially only the frequency of said carrier component and to provide product detection of said amplitude modulated carrier in said electron flow by said oscillations; and apparatus coupled to said electron flow means and responsive to said product detection in said electron flow to develop a voltage related to said product detection.

17. An oscillating synchronous detector for deriving the in-phase amplitude modulation information component of a vestigial sideband signal including a carrier and asymmetric sidebands, comprising: an amplifier device having input, output and common electrodes, an input circuit coupled to said input and common electrodes, and an output circuit coupled to said output and common electrodes; feedback means from said output circuit to said input circuit to maintain oscillations in said electron flow at a frequency substantially equal to the frequency of said carrier, said feedback means being constructed to pass a relatively narrow range of frequencies in the vicinity of said carrier; means to couple said vestigial sideband signal to said input circuit, said electron flow device and said input circuit being constructed to present a double-limiting characteristic to said vestigial sideband signal; whereby the oscillations in said electron stream are locked in phase, rather than in quadrature phase, with said carrier; and means to derive said in-phase amplitude demodulation information from said output circuit.

18. An oscillating synchronous detector for deriving the in-phase amplitude modulation information component of a vestigial sideband signal including a carrier and asymmetric sidebands, comprising: an electron flow device and associated input and output circuits, feedback means from said output circuit to said input circuit to maintain oscillations in said electron flow at a frequency substantially equal to the frequency of said carrier, said feedback means being constructed to pass a relatively narrow range of frequencies in the vicinity of said carrier, means to couple said vestigial sideband signal to said input circuit, said electron flow device and said input circuit being constructed to present a double-limiting characteristic to said vestigial sideband signal, whereby the oscillations in said electron stream are locked in phase, rather than in quadrature phase, with said carrier, and means to derive said in-phase amplitude demodulation information from said output circuit.

19. An oscillating synchronous detector as defined in claim 18 wherein said amplifier device is a triode and wherein said double-limiting characteristic is obtained by reduced anode potential.

20. An oscillating synchronous detector as defined in claim 18 wherein said amplifier device is a triode having a heater-cathode and wherein said double-limiting characteristic is obtained by reduced cathode temperature.

21. An oscillating synchronous detector as defined in claim 18 wherein said amplifier device is a pentode and wherein said double-limiting is obtained by plate bottoming.

22. An oscillating synchronous detector as defined in claim 18 wherein said amplifier device is a pentagrid converter tube.

23. An oscillating synchronous detector as defined in claim 18 wherein said amplifier device is a transistor.

References Cited in the file of this patent

UNITED STATES PATENTS

| | | |
|---|---|---|
| 1,330,471 | Kendall | Feb. 10, 1920 |
| 2,040,221 | Tubbs | May 12, 1936 |
| 2,060,142 | Urtel et al. | Nov. 10, 1936 |
| 2,165,764 | Pitsch | July 11, 1939 |
| 2,273,023 | De Bellescize | Feb. 17, 1942 |
| 2,681,988 | Oliver | June 22, 1954 |

FOREIGN PATENTS

| | | |
|---|---|---|
| 105,225 | Australia | Sept. 20, 1938 |
| 669,669 | Germany | Dec. 8, 1938 |